United States Patent [19]

Mihara

[11] Patent Number: 4,768,117
[45] Date of Patent: Aug. 30, 1988

[54] TAPE GUIDE DRUM APPARATUS HAVING MAGNETIC HEADS MOUNTED AT DIFFERENT HEIGHT POSITIONS

[75] Inventor: Masato Mihara, Hiratsuka, Japan

[73] Assignee: Victor Company of Japan, Ltd., Yokohama, Japan

[21] Appl. No.: 890,758

[22] Filed: Jul. 25, 1986

[30] Foreign Application Priority Data

Jul. 29, 1985 [JP] Japan .......................... 60-116048[U]

[51] Int. Cl.4 .......................... G11B 5/53; G11B 5/56; G11B 21/24
[52] U.S. Cl. .................................... 360/109; 360/104
[58] Field of Search ................ 360/109, 107, 129, 104

[56] References Cited

U.S. PATENT DOCUMENTS 4,497,005  1/1985  Heinz ................................ 360/109
4,587,587  5/1986  Miller ................................ 360/109

FOREIGN PATENT DOCUMENTS 58-40222  9/1984  Japan .................................. 360/109

Primary Examiner—Robert S. Tupper
Attorney, Agent, or Firm—Michael N. Meller

[57] ABSTRACT

A tape guide drum apparatus comprises a rotary body and at least one magnetic head unit mounted on the rotary body. The magnetic head unit comprises a single support plate, first and second magnetic heads, and first and second bases mounted on upper and lower surfaces of the support plate for supporting the first and second magnetic heads at mutually different height positions. The height positions of the first and second magnetic heads are adjustable by use of first and second height adjusting screws. A relative displacement of the first and second magnetic heads is adjustable by use of an eccentric pin inserted into adjusting holes formed in the support plates. The first and second magnetic heads record and/or reproduce signals on and/or from a magnetic tape in respective recording regions separated in a width direction of the magnetic tape.

4 Claims, 4 Drawing Sheets

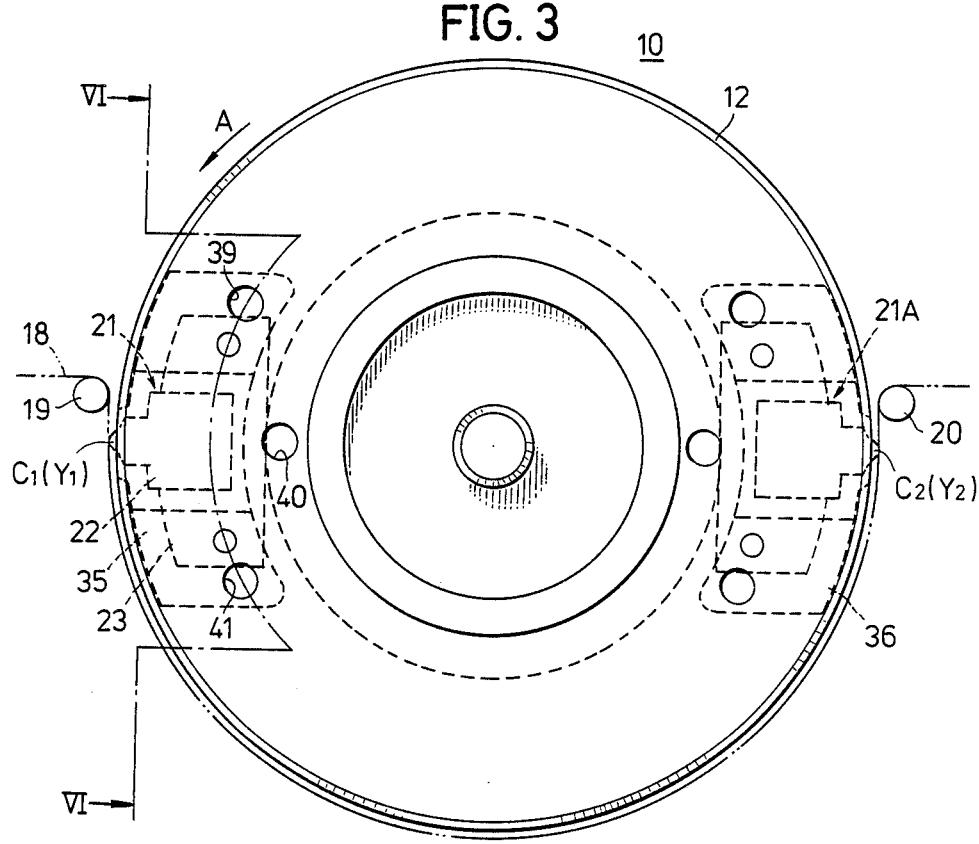
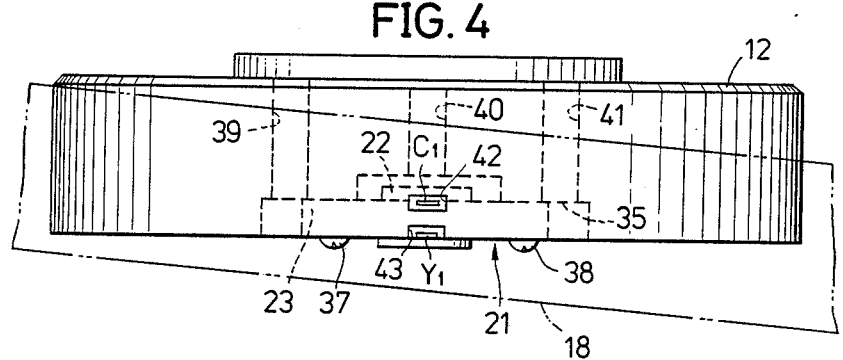

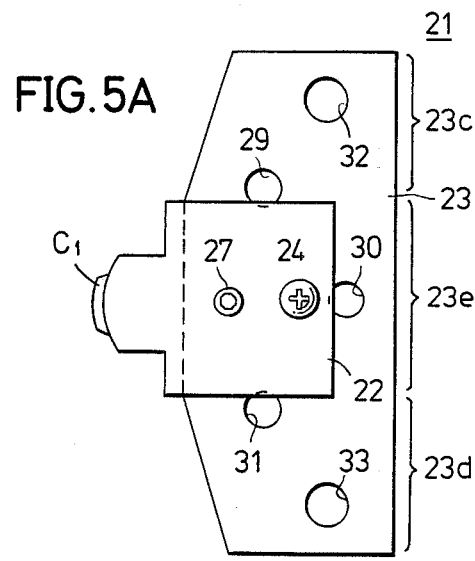
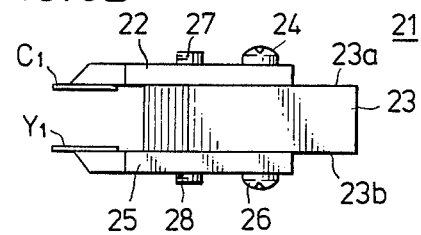
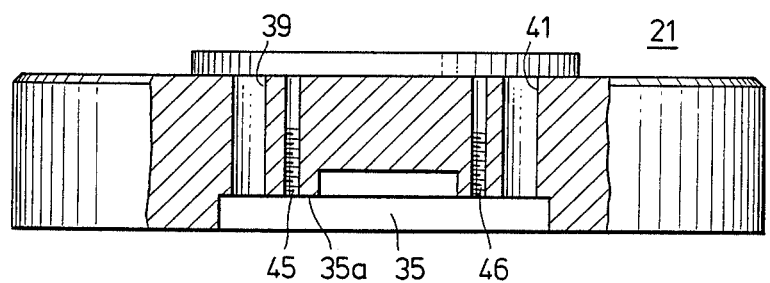

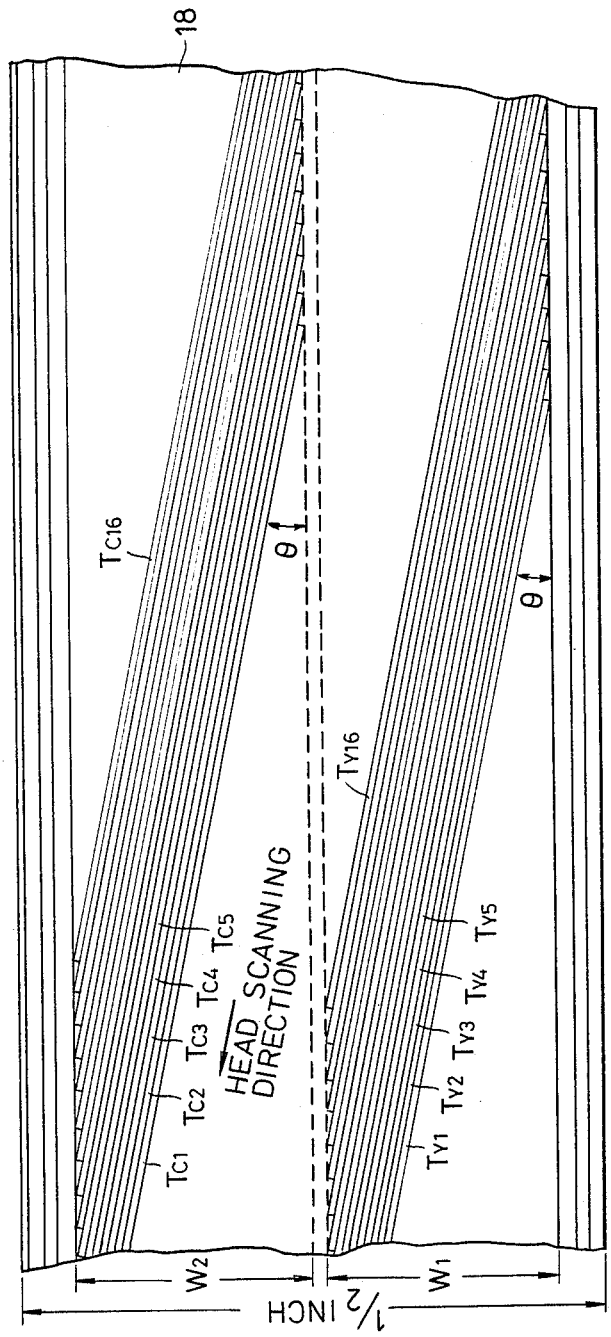

TAPE GUIDE DRUM APPARATUS HAVING MAGNETIC HEADS MOUNTED AT DIFFERENT HEIGHT POSITIONS

BACKGROUND OF THE INVENTION

The present invention generally relates to tape guide drum apparatuses, and more particularly to a tape guide drum apparatus having magnetic heads mounted at different height positions so as to record and/or reproduce different kinds of signals on and/or from a magnetic tape in recording regions which are separated in a width direction of the magnetic tape.

A magnetic recording and reproducing apparatus was previously proposed in a U.S. patent6 application Ser. No. 833,861 filed Feb. 26, 1986 entitled "HELICAL SCAN TYPE MAGNETIC RECORDING AND REPRODUCING APPARATUS" in which the assignee is the same as the assignee of the present application. According to the previously proposed apparatus, three kinds of signals constituting a color video signal are recorded on a plurality of tracks which are mutually separated in a width direction of a magnetic tape by use of a plurality of rotary magnetic heads which simultaneously and independently form the plurality of tracks, and a picture having a satisfactory quality and having only an extremely small time base deviation is obtained at the time of a reproduction.

More specifically, a frequency modulated luminance signal is recorded in a lower half recording region of the magnetic tape having a width of ½ inch, and a frequency division multiplexed signal of frequency modulated color difference signals and frequency modulated audio signals is recorded in an upper half recording region of the magnetic tape. The frequency modulated luminance signal and the frequency division multiplexed signal are simultaneously recorded on tracks which are formed obliquely to the longitudinal direction of the magnetic tape within the respective recording regions. In order to carry out the recording on the magnetic tape having such a track pattern, it is necessary to use a tape guide drum apparatus having two pairs of heads. A first pair of heads consists of two heads mounted on a rotary drum at mutually opposing positions on a rotational plane of the rotary drum. A second pair of heads consists of two heads mounted on the rotary drum at mutually opposing positions on the rotational plane of the rotary drum. The positions of the first pair of heads substantially coincide with the positions of the second pair of heads on the rotational plane of the rotary drum. On the other hand, the height positions of the heads constituting the first pair are the same and the height positions of the heads constituting the second pair are the same, but the height position of the first pair of heads and the height position of the second pair of heads are different.

Because the tape guide drum apparatus must have the two pairs of heads arranged at different height positions on the rotary drum, the tape guide drum apparatus must have such a special design that the positions of the heads can be adjusted with ease.

For example, it is possible to conceive a tape guide drum apparatus wherein the heads for recording the frequency modulated luminance signal and the heads for recording the frequency division multiplexed signal are fixed on independent mounting plates (bases) and the mounting plates are mounted on the rotary drum with the heights thereof made different from each other. However, according to such a tape guide drum apparatus, it is necessary to adjustment the position of each of the heads after the mounting of the heads is completed. The positional adjustments include adjustments of the height positions of the heads, relative positions of the upper and lower heads, projecting quantities of the heads from the outer peripheral surface of the rotary drum, and relative positions of the heads mounted at mutually opposite positions. As a result, it will be extremely difficult to adjust the mounting positions of the heads with a high accuracy. Furthermore, it will be troublesome to perform such positional adjustments, and this conceivable tape guide drum apparatus is unsuited for mass production.

SUMMARY OF THE INVENTION

Accordingly, it is a general object of the present invention to provide a novel and useful tape guide drum apparatus in which the problems described heretofore are eliminated.

Another and more specific object of the present invention is to provide a tape guide drum apparatus comprising a rotary body and a magnetic head unit which has a single support plate mounted with first and second magnetic heads at mutually different height positions. The magnetic head unit is designed so that the height positions and relative positions of the first and second magnetic heads can be adjusted. According to the tape guide drum apparatus of the present invention, it is possible to adjust the height positions and the relative positions of the first and second magnetic heads beforehand in a state where the first and second magnetic heads take the form of the magnetic head unit which is easy to work on. For this reason, it is unnecessary to adjust the height positions and the relative positions of the first and second magnetic heads after the magnetic head unit is mounted on the rotary body. Accordingly, after the magnetic head unit is mounted on the rotary body, it is only necessary to adjust the projecting quantities of the first and second magnetic heads from the outer peripheral surface of the rotary body and the positions of the first and second magnetic heads along the circumferential direction of the rotary body. Furthermore, the above adjustments need not be performed independently for each of the first and second magnetic heads, and the adjustments can be performed simultaneously for the first and second magnetic heads. Hence, in an assembling process of the tape guide drum apparatus, adjusting processes can be divided into a process of performing the adjustments on the magnetic head unit and a process of performing the adjustments after the magnetic head unit is mounted on the rotary body. Therefore, it is possible to improve the operation efficiency of the assembling process of the tape guide drum apparatus, and the adjusting processes are suited for mass production of the tape guide drum apparatus. In addition, compared to the case where the first and second magnetic heads are mounted independently on the rotary body, it is easier to mount the first and second magnetic heads on the rotary body according to the present invention.

Other objects and further features of the present invention will be apparent from the following detailed description when read in conjunction with the accompanying drawings.

BRIEF DESCRIPTION OF THE DRAWINGS

FIG. 3 is a plan view showing the embodiment of the tape guide drum apparatus according to the present invention;

FIG. 4 is a front view showing a rotary drum mounted with a magnetic head unit;

FIGS. 5A and 5B are a plan view and a front view respectively showing the magnetic head unit on an enlarged scale;

FIG. 6 is a cross sectional view along a line VI—VI in FIG. 3 showing the construction of a magnetic head unit mounting part of the rotary drum with the magnetic head unit omitted; and FIG. 7 shows a track pattern formed on a magnetic tape by the tape guide drum apparatus according to the present invention.

DETAILED DESCRIPTION

Figure 2:
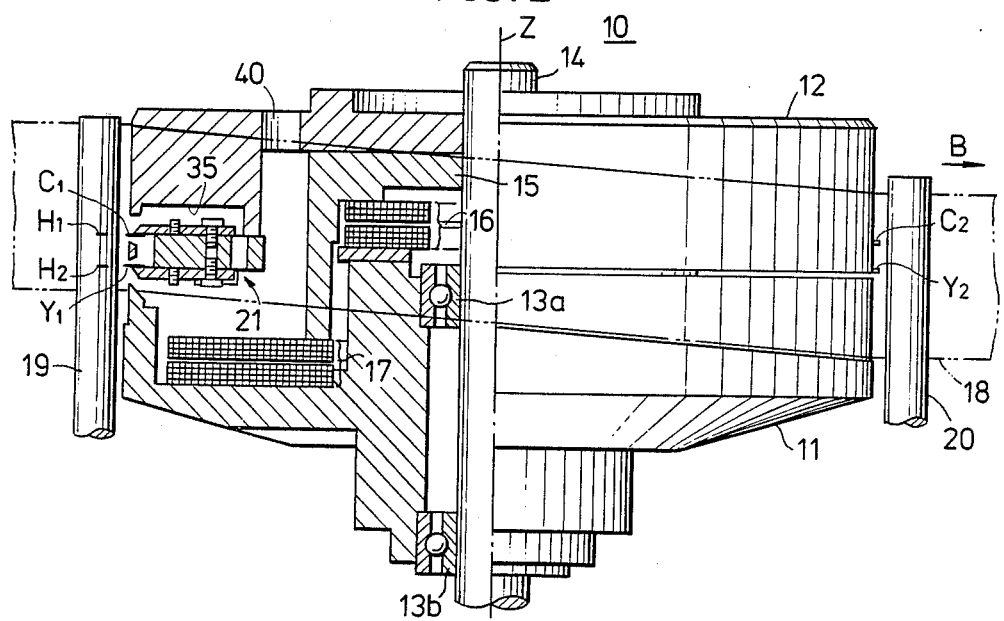
FIG. 2 is a front view with a part in vertical cross section showing the embodiment of the tape guide drum apparatus according to the present invention.

As shown in FIGS. 2 and 3, a tape guide drum apparatus 10 generally comprises a lower stationary drum 11 and an upper rotary drum 12 which rotates in a direction A. Upper rotary magnetic heads C1 and C2 for recording and/or reproducing a frequency division multiplexed signal of frequency modulated color difference signals and frequency modulated audio signals are mounted on the rotary drum 12 at a height position H1 along an axial direction Z. Lower rotary magnetic heads Y1 and Y2 for recording and/or reproducing a frequency modulated luminance signal are mounted on the rotary drum 12 at a height position H2 along the axial direction Z. The heads C1 and Y1 are separated by a predetermined angle from the heads C2 and Y2 along the circumferential direction of the rotary drum 12. For example, the predetermined angle is 180°. In addition, the heads C1 and Y1 and the heads C2 and Y2 are respectively aligned along the axial direction Z. A shaft 14 is supported by bearings 13a and 13b, and a flywheel 15 is fixed on the shaft 14. The rotary drum 12 is fitted on the shaft 14 and is fixed to the flywheel 15. First and second rotary transformers 16 and 17 respectively perform signal transmission and reception between amplifier circuits in a recording and reproducing system (not shown) and the heads C1 and C2 and the heads Y1 and Y2.

A magnetic tape 18 is wrapped obliquely around the tape guide drum apparatus 10 for a certain angular range determined by guide poles 19 and 20 and is transported in a direction B. This certain angular range is greater than 180°. The heads C1, C2, Y1 and Y2 scan the tape 18, and a track pattern shown in FIG. 7 is formed on the tape 18. In FIG. 7, tracks $T_{C1}$ through $T_{C16}$ are formed in an upper half recording region W2 on the tape 18 by the heads C1 and C2. The frequency division multiplexed signal described before is recorded on the tracks tracks $T_{C1}$ through $T_{C16}$. Tracks $T_{Y1}$ through $T_{Y16}$ are formed in a lower half recording region W1 on the tape 18 by the heads Y1 and Y2. The frequency modulated luminance signal described before is recorded on the tracks $T_{Y1}$ through $T_{Y16}$. The tracks $T_{C1}$ through $T_{C16}$ and the tracks $T_{Y1}$ through $T_{Y16}$ are respectively inclined by an angle $\theta$ with respect to the longitudinal direction of the tape 18. For convenience' sake, only sixteen tracks are shown in each of the recording regions W1 and W2 in FIG. 7.

FIGS. 5A and 5B show a magnetic head unit 21. The magnetic head unit 21 generally comprises a substantially rectangular support plate 23, a base 22 fixed on an upper surface 23a of the support plate 23 by a screw 24, and a base 25 fixed on a lower surface 23b of the support plate 23 by a screw 26. The head C1 is fixed to an end of the base 22, and the head Y1 is fixed to an end of the base 25. In other words, the magnetic head unit 21 comprises the heads C1 and Y1 and the like as a single unit. Height adjusting screws 27 and 28 are provided on the respective bases 22 and 25. Relative position adjusting holes 29, 30 and 31 are formed in the support plate 23. The relative positions of the heads C1 and Y1 can be adjusted by inserting an eccentric pin (not shown) into the holes 29, 30 and 31 and appropriately turning the eccentric pin as will be described later. Hence, the magnetic head unit 21 is provided with height position adjusting means and relative position adjusting means for the heads C1 and Y1.

The support plate 23 has overhang parts 23c and 23d respectively overhanging from both sides of the bases 22 and 25. Mounting holes 32 and 33 are formed in the parts 23c and 23d. In addition, the support plate 23 has a band part 23e at the rear of the base 22.

In a state where the magnetic head unit 21 is assembled, that is, in a state before the magnetic head unit 21 is mounted on the rotary drum 12, the height positions and the relative positions of the heads C1 and Y1 are adjusted. The magnetic head unit 21 is set on an adjusting tool (not shown) by use of the mounting holes 32 and 33, and the screws 27 and 28 are appropriately turned so as to adjust the height positions of the heads C1 and Y1 with respect to a reference plane. For example, the reference plane is the upper surface 23a of the support plate 23 by which surface the magnetic head unit 21 is mounted on the rotary drum 12. The relative positions of the heads C1 and Y2 are adjusted by inserting an eccentric pin (not shown) into the holes 29 through 31 and appropriately turning the eccentric pin so as to push the peripheral side surfaces of the bases 22 and 25 and shift the positions thereof.

Since the magnetic head unit 21 can be handled with ease, it is easy to adjust the height positions and the relative positions of the heads C1 and Y1 compared to the case where the adjustments are made after the magnetic head unit 21 is mounted on the rotary drum 12.

At parts of the lower surface of the rotary drum where the magnetic head unit 21 is mounted thereon, there are formed depressed mounting parts 35 and 36 as shown in FIGS. 3 and 6. Especially a mounting surface 35a of the depressed mounting part 35 is formed with a high accuracy. A mounting surface of the depressed mounting part 36 is also formed with a high accuracy.

The magnetic head unit 21 which has been adjusted of the height positions and relative positions of the heads C1 and Y1 is accommodated within the depressed mounting part 35 as shown in FIGS. 1 through 4. The magnetic head unit 21 is fixed to the rotary drum 12 by screws 37 and 38 which are screwed into the respective mounting holes 32 and 33 and holes 44 and 45 shown in FIG. 6. After the magnetic head unit 21 is mounted on the rotary drum 12, the eccentric pin (not shown) is inserted into position adjusting holes 39, 40 and 41 formed in the rotary drum 12 and appropriately turned so as to adjust the positions (180° angular separation from the corresponding heads C2 and Y2) of the heads C1 and Y1 along the circumferential direction of the rotary drum 12 and adjust the projecting quantities of the heads C1 and Y1 from the outer peripheral surface of the rotary drum 12. Because the heads C1 and Y1 are provided as a single unit, the positions of the heads C1 and Y1 along the circumferential direction can be adjusted simultaneously for the two heads C1 and Y1. Further, the projecting quantities of the heads C1 and Y1 from the outer peripheral surface of the rotary drum 12 can also be adjusted simultaneously for the two heads C1 and Y1. Therefore, the adjusting operations can be performed with ease compared to the case where the adjustments must be made independently for the two heads C1 and Y1.

The magnetic head unit 21 is mounted on the rotary drum 12 so that the upper surface 23a of the support plate 23 at the parts 23c, 23d and 23e thereof is in contact with the mounting surface 35a which is formed with the high accuracy. Hence, the height positions of the heads C1 and Y1 on the rotary drum 12 are accurately determined, and the height positions of the heads C1 and Y1 need not be adjusted again after the magnetic head unit 21 is mounted on the rotary drum 12. In addition, because the relative positions of the heads C1 and Y1 have already been adjusted before the magnetic head unit 21 is mounted on the rotary drum 12, it is unnecessary to readjust the relative positions of the heads C1 and Y1 after the magnetic head unit 21 is mounted on the rotary drum 12.

Therefore, after the magnetic head unit 21 is mounted on the rotary drum 12, it is sufficient to simply adjust the positions of the heads C1 and Y1 along the circumferential direction of the rotary drum 12 and adjust the projecting quantities of the heads C1 and Y1 from the outer peripheral surface of the rotary drum 12. Thus, it is possible to perform the necessary adjustments with ease and with high accuracy.

Figure 1:
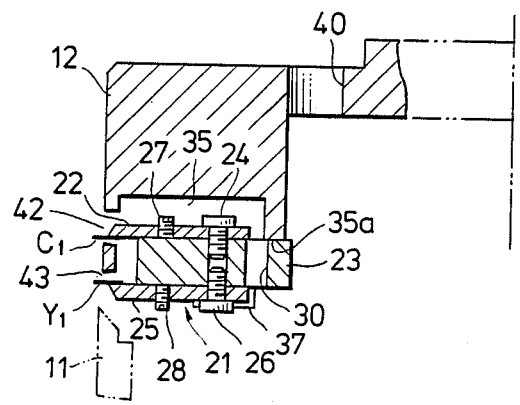
FIG. 1 is a cross sectional view on an enlarged scale showing an essential part of an embodiment of the tape guide drum apparatus according to the present invention.

The heads C1 and Y1 respectively project from the rotary drum 12 via head windows 42 and 43 as shown in FIGS. 1 and 4.

In FIG. 3, another magnetic head unit 21A is accommodated within the depressed mounting part 36 of the rotary drum 12 and is mounted on the rotary drum 12 similarly as in the case of the magnetic head unit 21. The magnetic head unit 21A has a construction which is substantially the same as that of the magnetic head unit 21 except that the magnetic head unit 21A comprises the heads C2 and Y2.

When one magnetic head unit 21 (or 21A) is mounted on the rotary drum 12, it is possible to mount two heads C1 and Y1 (or C2 and Y2) on the rotary drum 12. Thus, compared to the case where the heads C1, Y1, C2 and Y2 are mounted independently on the rotary drum 12, the operation of mounting the heads C1, Y1, C2 and Y2 on the rotary drum 12 is simple according to the present invention.

Accordingly, the tape guide drum apparatus 10 according to the present invention can be assembled and adjusted with ease, and the construction of the tape guide drum apparatus 10 is suited for mass production.

In the case where the present invention is applied to a tape guide drum apparatus comprising upper and lower stationary drums and a rotary disc provided between the upper and lower stationary drums, the magnetic head units 21 and 21A are mounted on the rotary disc.

Further, the present invention is not limited to these embodiments, but various variations and modifications may be made without departing from the scope of the present invention.

What is claimed is:

1. A tape guide drum apparatus comprising;
a rotary body; and
at least one magnetic head unit mounted on said rotary body,
said magnetic head unit comprising a single support plate, first and second magnetic heads, a first base mounted on an upper surface of said support plate by first fastening means, said first magnetic head being fixed to said first base, a second base mounted on a lower surface of said support plate by second fastening means, said second magnetic head being fixed to said second base, first and second height adjusting screws respectively provided on said first and second bases for adjusting the height positions of said first and second magnetic heads relative to the upper and lower surfaces of said support plate, respectively, adjusting holes provided in said support plate so that a relative displacement of said first and second magnetic heads along the upper and lower surfaces of said support plate is adjusted by use of an eccentric pin inserted therein and turned appropriately,
said first and second magnetic heads recording and/or reproducing signals on and/or from a magnetic tape in respective recording regions separated in a width direction of the magnetic tape.

2. A tape guide drum apparatus as claimed in claim 1 in which said support plate has overhang parts overhanging from both sides of said first and second magnetic heads, said rotary body having a mounting surface to which said overhang parts of said support plate are mounted, said magnetic head unit being mounted on said rotary body by screws with said overhang parts in contact with said mounting surface.

3. A tape guide drum apparatus as claimed in claim 1 in which said rotary body has position adjusting holes formed at positions in a periphery of said support plate, projecting quantities of said first and second heads from an outer peripheral surface of said rotary body and positions of said first and second magnetic heads along a circumferential direction of said rotary body being adjusted by use of an eccentric pin inserted through said position adjusting holes and turned appropriately.

4. A tape guide drum apparatus as claimed in claim 1 in which said rotary body comprises a rotary drum, said magnetic head unit being mounted on a lower surface of said rotary drum.

* * * * *